Oct. 8, 1957

B. P. BAKER ET AL 2,809,259

CIRCUIT INTERRUPTERS

Filed April 15, 1955

9 Sheets-Sheet 1

Oct. 8, 1957 B. P. BAKER ET AL 2,809,259

CIRCUIT INTERRUPTERS

Filed April 15, 1955 9 Sheets-Sheet 2

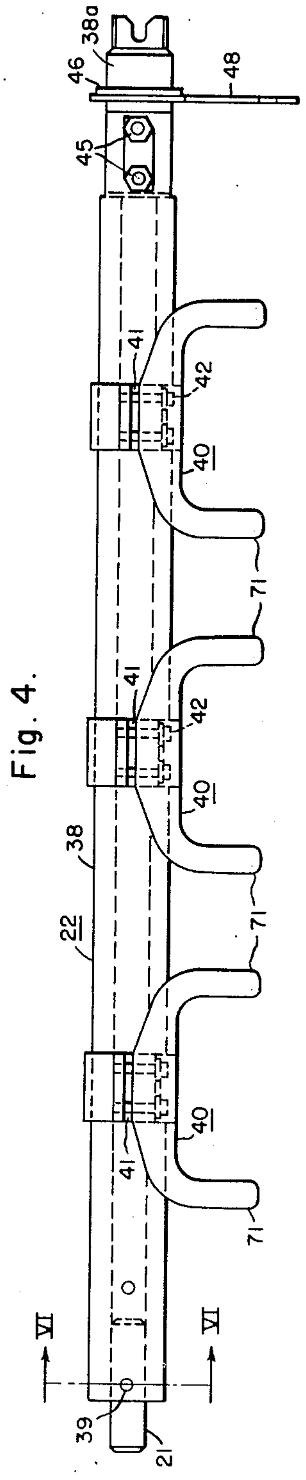
Fig. 7.
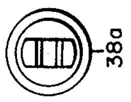
Fig. 6
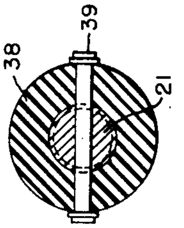
Fig. 5.
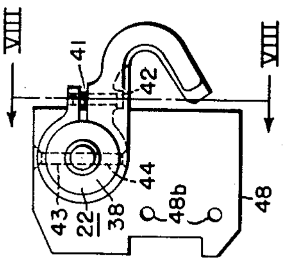
Fig. 8.
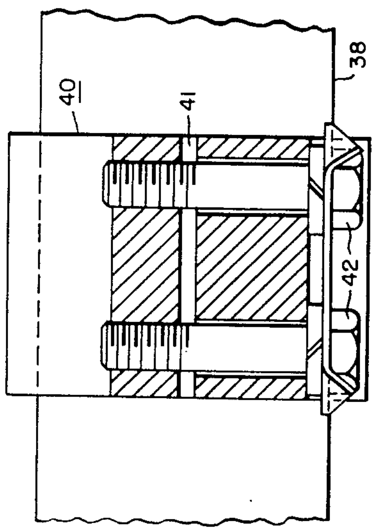

Oct. 8, 1957

B. P. BAKER ET AL 2,809,259

CIRCUIT INTERRUPTERS

Filed April 15, 1955

9 Sheets-Sheet 6

Oct. 8, 1957 B. P. BAKER ET AL 2,809,259

CIRCUIT INTERRUPTERS

Filed April 15, 1955 9 Sheets-Sheet 9

WITNESSES
Robert C. Baird
W. R. Crout

INVENTORS
Benjamin P. Baker, Charles F. Cromer
and Joseph Sucha.
BY
Ralph H. Swingle
ATTORNEY United States Patent Office 2,809,259

Patented Oct. 8, 1957

2,809,259

CIRCUIT INTERRUPTERS

Benjamin P. Baker, Monroeville, Charles F. Cromer, Pittsburgh, and Joseph Sucha, McKeesport, Pa., assignors to Westinghouse Electric Corporation, East Pittsburgh, Pa., a corporation of Pennsylvania Application April 15, 1955, Serial No. 501,535

18 Claims. (Cl. 200—145)

This invention relates to circuit interrupters in general, and, more particularly, to improved arc-extinguishing structures therefor.

A general object of the invention is to provide an improved circuit interrupter particularly adapted for interrupting leading currents, such as the currents associated with shunt capacitor banks, and which will also have considerable fault-interrupting ability.

In United States patent application filed May 26, 1954, Serial No. 432,466, by Winthrop M. Leeds, entitled "Circuit Interrupters," and assigned to the assignee of the instant application, there are disclosed novel circuit interrupters particularly adapted for interrupting currents associated with the switching of shunt capacitor banks. As set forth diagrammatically in said application, the use of such capacitor banks, and the switching thereof, not only assists in improving the power factor associated with the transmission system, but such use also improves the voltage regulation. In the particular capacitor switches set out in this application by Leeds, a generally tubular arrangement is employed with rotatable bridging contacts, and in one particular construction a longitudinally extending barrier plate having apertures therethrough is employed to separate the pressure-generating chamber associated with the stationary contact compartment from the interrupting chamber, in which the rotatable movable contact assembly rotates. The multibreak switches set out in the Leeds application, particularly when used with an arc-extinguishing gas, such as sulfur hexafluoride, give rise to greatly improved interrupting performance particularly when applied to capacitor switching. The present invention is concerned with improving the general operating arrangement of the aforesaid Leeds construction, adapting it for higher interrupting ratings and, in addition, providing more effective compressed-fluid flow conditions for improving the operation during fault current interruption. In addition, the present application is concerned with improving the interrupting structures so as to further extend the upper interrupting limit of such a multibreak rotating contact structure.

A more specific object of the present invention is to provide an economical, simple and highly effective multibreak switch and to improve interrupting structures associated therewith.

Another object is to provide an improved circuit interrupter having a novel puffer arrangement, or piston construction, which will compress the fluid, such as gas, used in the interrupting structure to assist in the interruption of fault currents or the currents associated with inductive circuits. However, the advantage of multibreaks is retained, which are particularly effective for capacitor switching operations, and which provide a long isolating gap distance for a relatively short rotative travel of the movable contact structure.

Still another object of the invention is to provide a novel piston arrangement, which will compress a considerable volume of gas in a location which is immediately adjacent to interrupting structures, so that only a very short working travel of the gas or fluid is necessitated prior to its injection into the arc stream.

Still a further object of the invention is to provide butt contacts instead of finger contacts, since for highly repetitive, but relatively light duty, where lubrication is impractical, butt contacts provide longer life.

Still a further object of the invention is to provide a simple and easily assembled interrupting board, or support construction, which will be highly effective for multibreak operation.

Yet a further object of the invention is to provide an improved construction in which any condensation of the enclosed gas will be directed to fall to ground potential away from insulating surfaces.

Further objects and advantages will readily become apparent upon reading the following specification, taken in conjunction with the drawings, in which:

Fig. 4 is a side elevational view of the movable contact structure employed in the interrupter of Figs. 1 and 2;

Fig. 5 is an end elevational view of the movable contact structure illustrated in Fig. 4;

Fig. 6 is an enlarged, sectional view taken substantially along the line VI—VI of Fig. 4;

Fig. 7 is a fragmentary end elevational view of the other end of the movable contact assembly of Fig. 4 from the view taken in Fig. 5;

Fig. 8 is an enlarged fragmentary view taken along the line VIII—VIII of Fig. 5 showing the clamping arrangement for the movable contacts;

Figure 1:
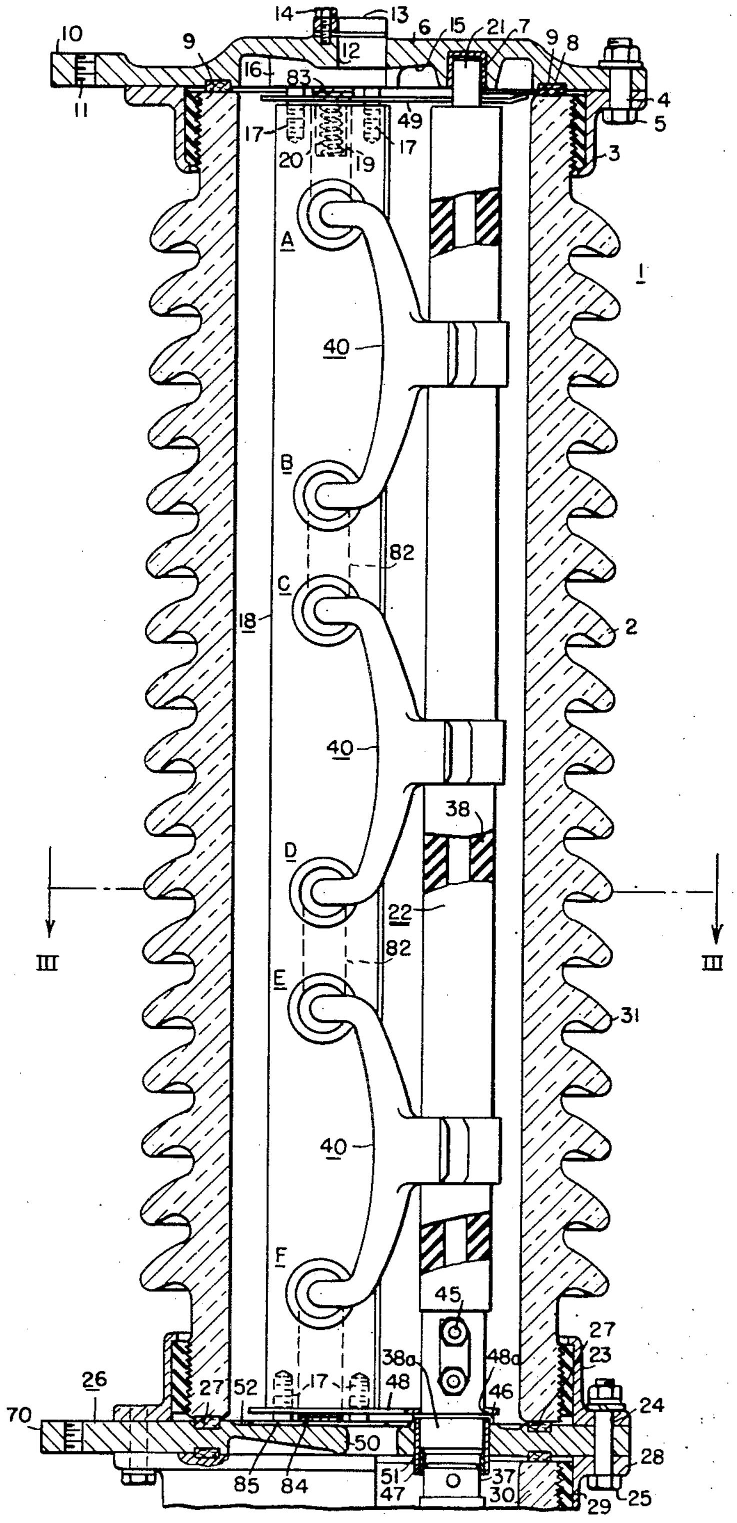
Figure 1 is a vertical sectional view through the upper half of a circuit interrupter embodying the invention, the contact structure being shown in the closed-circuit position.

Referring to the drawings, and more particularly to Fig. 1 thereof, the reference numeral 1 generally designates a circuit interrupter patricularly adapted for capacitor switching operation, such as diagrammatically illustrated in the aforesaid Leeds application, and also which has considerable load-interrupting ability. The circuit interrupter 1 is in this particular instance illustrated as being of the sealed gas type, employing a suitable arc-extinguishing gas, preferably sulfur hexafluoride, the remarkable arc-extinguishing properties of which are set out in United States patent application filed July 19, 1951, Serial No. 237,502, issued July 31, 1956, as United States Patent, 2,757,261 to Harry J. Lingal, Thomas E. Browne, Jr., and Albert P, Strom, and which is assigned to the assignee of the instant application.

Although the invention is illustrated in connection with a sealed chamber enclosing sulfur hexafluoride gas, it is to be clearly understood that some features of the structure of the invention may be advantageously utilized with other gases, or fluids, or even with liquids, such as oil. However, other aspects of the invention require, for best results, the use of an arc-extinguishing gas such as $SF_6$ or gases having similar properties, such as selenium hexafluoride ($SeF_6$) or mixtures of those gases with each other or with inert gases, such for example as helium, carbon dioxide, air, nitrogen, and argon.

The use of selenium hexafluoride as an arc-extinguishing gas is described and claimed in United States Patent 2,733,316, issued January 31, 1956 to Thomas E. Browne, Jr., Albert P. Strom and Harvey E. Spindle and assigned to the assignee of the present application.

Generally, the circuit interrupter 1, illustrated in Fig. 1, includes an outer porcelain casing 2 having the usual petticoats to increase the external surface leakage distance, and having a mounting flange 3 cemented to its upper end. The mounting flange 3 has a plurality of peripherally disposed apertures 4 provided therein, through which mounting bolts 5 securely support in place a top metallic closure casting 6 having a bearing 7 therein. Preferably, to insure a gas-tight construction, a ring-shaped flexible gasket 8 is positioned within an annular groove 9 provided in the casting 6 and pressing against the upper end of the ceramic casing 2.

The top casting 6 has a laterally extending terminal portion 10 provided with a tapped aperture 11, to which a suitable line connection may be made. Also, the closure casting 6 has an opening 12, which is normally closed by a cap 13 bolted in place by screws 14 and also suitably gasketed.

The inner side 15 of the casting 6 has an elongated boss portion 16 provided with a pair of mounting apertures, into which extend mounting pins 17, which are secured to the upper end of a stationary contact board, or support member, generally designated by the reference numeral 18, and shown more particularly in Figs. 9–12 of the drawings. At the upper end of the stationary contact board 18 is also provided a recess 19, more particularly shown in Figs. 11 and 12, and accommodating a contact compression spring 20, the purpose for which will be more apparent hereinafter.

Rotatable within the bearing 7 is a pin 21 associated with the upper end of a rotatable, movable contact assembly, generally designated by the reference numeral 22, and the construction of which is more readily apparent from an inspection of Figs. 4–8 of the drawings. At the lower end of the porcelain casing 2 is secured a mounting flange 23 by cement, or other suitable means, having mounting apertures 24 spaced along the periphery thereof and accommodating a plurality of mounting bolts 25, which secure an intermediate casting plate 26 fixedly in place. Again the intermediate casting plate 26 has a ring-shaped gasket 27 associated therewith to insure a gas-tight seal. Disposed immediately below the casting plate 26 is another mounting flange 28, which is cemented, as at 29, to a cylindrical porcelain casing 30, again having surface irregularities, or petticoats 31. The lower end of the ceramic casing 30 has a mounting flange 32 cemented thereto, as at 33, as more clearly shown in Fig. 2 of the drawings. A plurality of mounting bolts 34 rigidly secure the mounting flange 32, and hence the casing 30, to a lower support casting 35, which may be suitably mounted in any desired manner.

A rotatable insulating operating shaft 36 extends upwardly interiorly within the casing 30, and is coupled, as at 37, to the lower end of the movable contact assembly 22, as more clearly shown in Fig. 1 of the drawings. More specifically, the coupling 37 at the upper end of the insulating tubular drive shaft 36 is removably coupled to another coupling **38*a*, the latter being secured to the lower end of the movable contact assembly 22**, as more clearly shown in Fig. 4.

Figure 3:
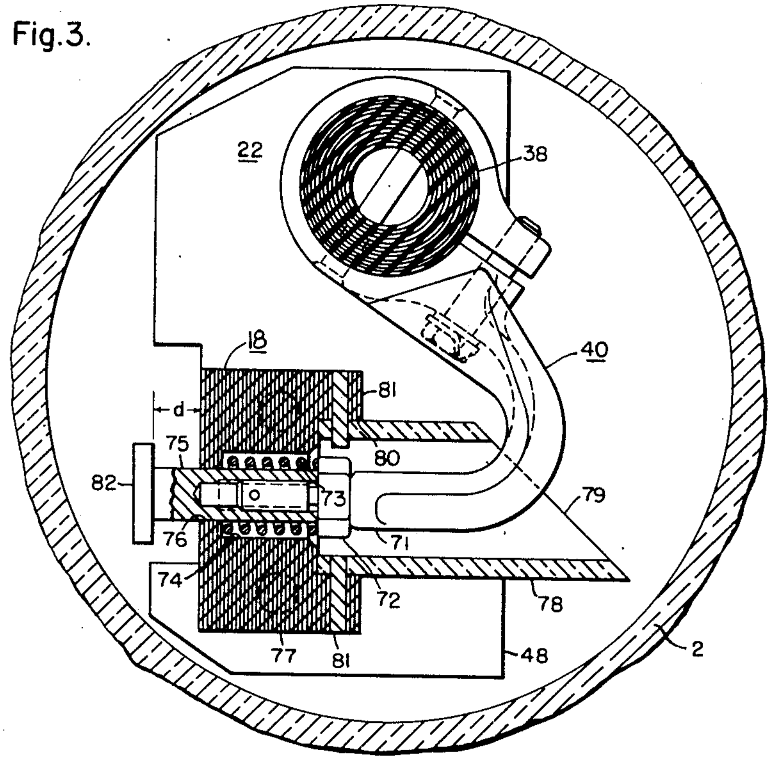
Fig. 3 is an enlarged cross-sectional view taken along the line III—III of Fig. 1, looking in the direction of the arrows, and the contact structure being illustrated in the closed-circuit position.

Thus, rotation of the insulating drive shaft 36 effects corresponding rotation of the movable contact assembly 22, and hence opening separating motion of the contact structure, as will be apparent upon inspection of Fig. 3 of the drawings.

The movable contact assembly 22 includes an insulating tube 38 having the pin 21 inserted at the upper end thereof, as indicated in Fig. 4. The pin 21, which rotates within the bearing 7 of the top casting 6, is secured into place by a cross-rivet 39 (Fig. 6). Spaced axially along the insulating tube 38 are a plurality of movable bridging contacts, generally designated by the reference numeral 40, and generally of hooked, U-shaped configuration, as will be apparent upon inspecting Figs. 1 and 3 of the drawings. Each movable bridging contact 40 is initially cast, and then a saw-cut 41 (Fig. 8) is made, whereby the bridging contact 40 is rendered resilient and may be slipped over the insulating tube 38 and clamped thereto by a plurality of clamping bolts 42, as more clearly shown in Figs. 5 and 8 of the drawings. A hole 43 is bored through the bridging contact 40 and also through the insulating tube 38, as indicated in Fig. 5. A rivet 44 is then passed therethrough to securely lock the bridging contact 40 to the tube 38. The lower end of the tube 38 is slotted, and has the coupling **38*a* secured thereto by a plurality of bolts 45, as shown in Fig. 4 of the drawings. Fig. 8 more clearly shows the clamping bolts 42, which secure the movable bridging contact castings 40 in place about the tube 38**.

The coupling **38*a* has a shoulder portion 46 which passes through a bushing 47 accommodated by the intermediate casting plate 26, as shown in Fig. 1. Also, a closure and positioning plate 48 is associated with the coupling 38*a*, and not only positions the movable contact assembly 22 a fixed distance from the stationary contact board 18**, but also closes the lower end of a piston chamber when used, as more fully described hereinafter.

The plate 48 has an aperture **48*a* (Fig. 1) therethrough, in which the coupling 38$a$ rotates. Also the plate 48 has two apertures 48$b$ (Fig. 5) accommodating two additional pins 17, disposed at the lower end of the stationary contact board 18**.

Figure 13:
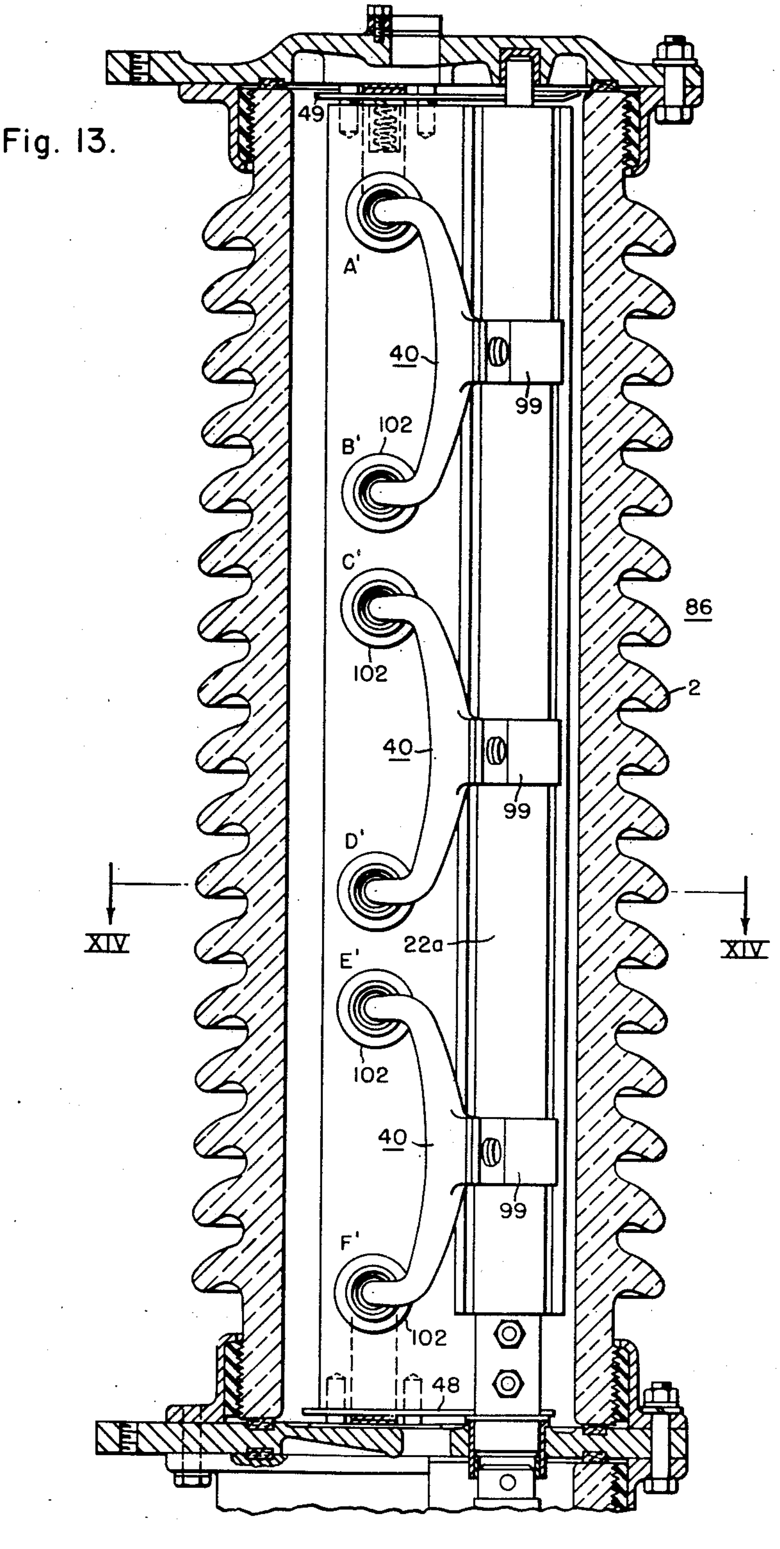
Fig. 13 is a vertical sectional view taken through a modified type of circuit interrupter, which employs a puffer or piston operating arrangement, the contact structure being illustrated in the closed-circuit position.
Figure 24:
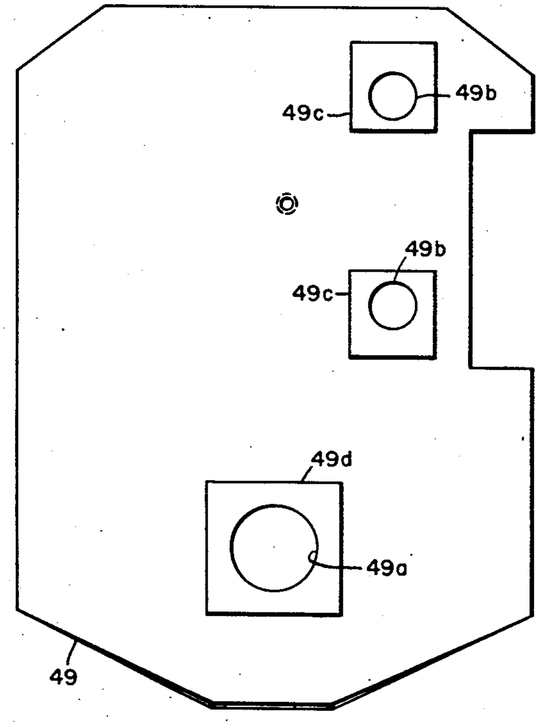
Fig. 24 is an enlarged top plan view of the upper drip pan used in both constructions of Fig. 1 and Fig. 13.
Figure 25:
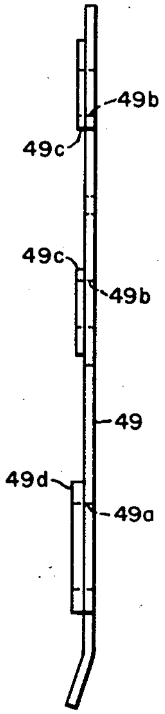
Fig. 25 is a side edge elevational view of the upper drip pan of Fig. 24.

At the upper end of the movable contact assembly 22, as viewed in Fig. 1, is disposed another closure and positioning plate 49 (Fig. 24), which has an aperture 49$a$ therethrough to accommodate the bearing pin 21, and which also has apertures 49$b$ therethrough to accommodate the mounting pins 17. This plate 49 spaces the upper ends of the stationary contact board 18 and the movable contact assembly 22 a fixed distance apart, and closes the upper end of the aforementioned piston chamber when the latter is employed, as illustrated in Fig. 13 of the drawings.

Not only do the positioning plates 48 and 49 facilitate initial assembly and inspection, but also they hold the assembly together when raising or lowering the same into the casing 2.

It will be noted that the intermediate casting plate 26 has a drip aperture 50 therethrough, which is spaced laterally away from aperture 51 provided in the intermediate casting plate 26 accommodating the bushing 47. As more fully described hereinafter, the drip aperture 50 in conjunction with a recessed portion or drip pan 52, provided on the upper surface of the casting plate 26, permits any condensate to fall, by gravity, through the drip aperture 50 and laterally away from the external surface of the insulating drive shaft 36, into a receptacle 53 integrally formed in the lower support casting 35. Here a heating element 54 may be employed, connected to a suitable heating circuit, to vaporize the collected condensate.

Further, upper positioning plate 49 has been made large enough to cover all parts thereunder, with added bosses 49$c$, 49$d$ (Fig. 24) about apertures 49$a$, 49$b$ so that any condensate will fall by gravity free of insulating surfaces.

Figure 2:
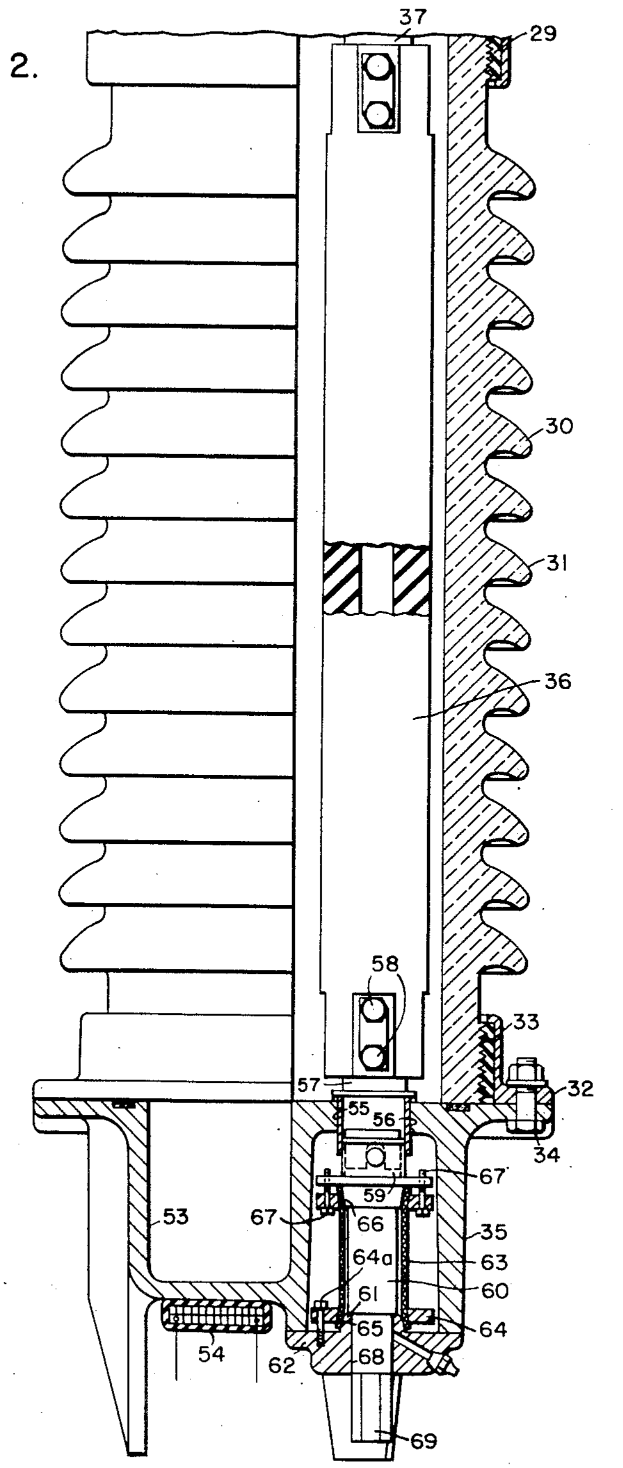
Fig. 2 is a side elevational view, partially in vertical section, of the lower half of the circuit interrupter of Fig. 1.

The support casting 35 also has an aperture 55 therethrough accommodating a bushing 56, which serves as a bearing for a coupling 57, the latter being bolted, as at 58, to the lower slotted end of the insulating drive shaft 36. The coupling 57 is connected to another coupling 59, disposed at the upper end of a metallic drive shaft 60 which has a shoulder 61 resting upon a closure cap 62, the latter being bolted to the lower end of the support casting 35, as illustrated in Fig. 2 of the drawings. A flexible rubber-like sleeve 63 is secured by a flange ring 64 to a beveled upstanding sealing portion 65 of the closure cap 62 by bolts 64$a$. The upper end of the flexible sleeve 63 is secured to a beveled portion 66 of the drive shaft 60 by a clamping flange 67. This insures that there will be no gas leakage along the drive shaft 60 through the bearing portion 68 of the closure cap 62. This sealing construction employing a flexible rubber-like sleeve 63, which permits a certain amount of rotation, is described and claimed in United States patent application filed April 9, 1956, Serial No. 576,875, by Harry J. Lingal, and assigned to the assignee of the instant application.

From the foregoing description it will be apparent that a suitable drive connection, not shown, may be connected to the lower protruding end 69 of the drive shaft 60 and hence through the coupling 59 and the coupling 57 effect rotation of the insulating drive shaft 36. It will be noted that the support casting 35 will preferably be at ground potential, whereas the couplings 37, 38$a$ and the intermediate casting plate 26 will be at line potential, a terminal portion 70 being associated with the intermediate casting plate 26.

Figures 9, 10, 11, 12:
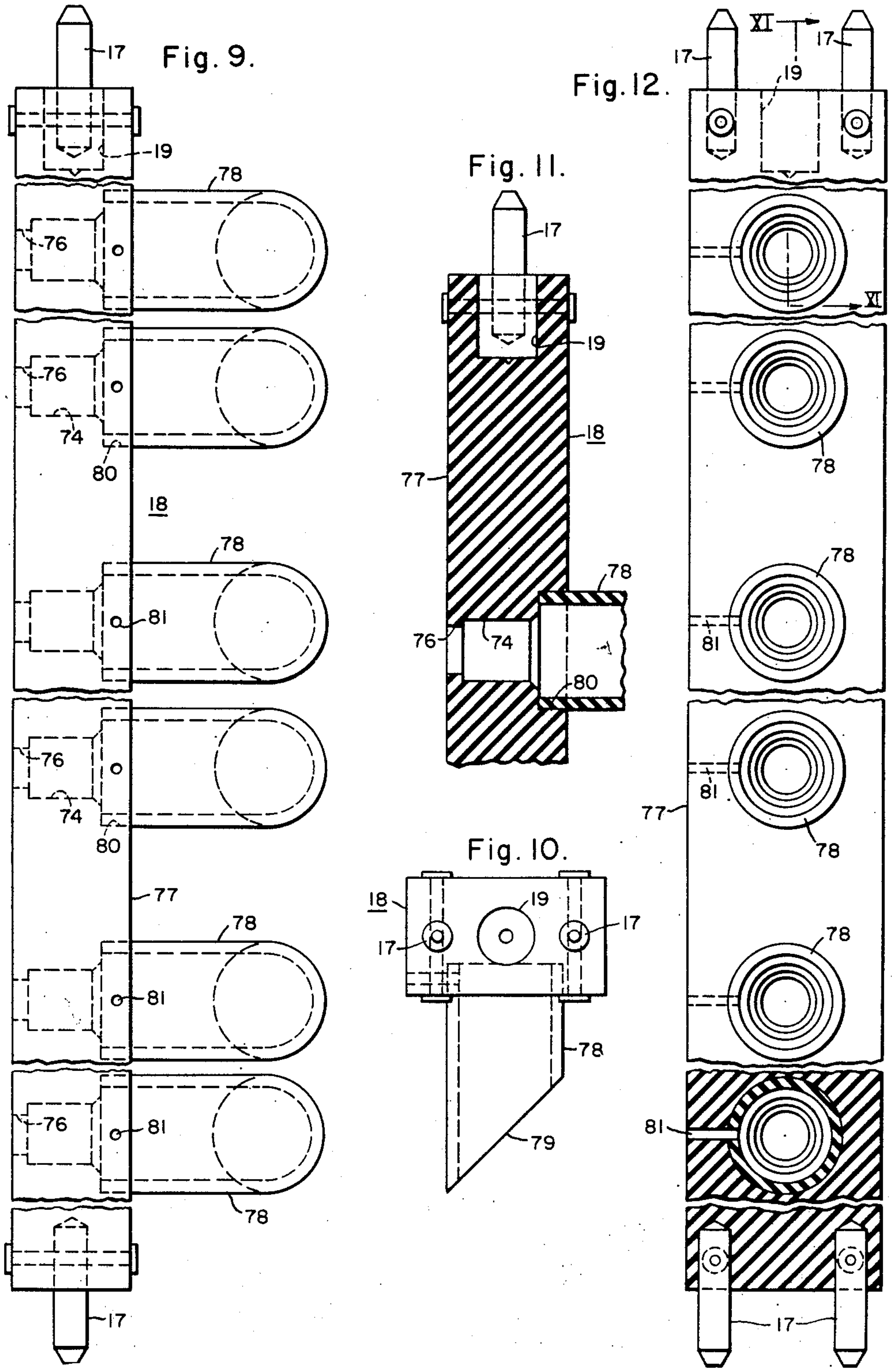
Fig. 9 is a fragmentary side elevational view of the stationary contact board support to which the interrupting structures are secured.
Fig. 10 is an end elevational view of the stationary contact board of Fig. 9.
Fig. 11 is a fragmentary cross-section view taken through the upper end of the stationary contact board of Fig. 9, substantially along the line XI—XI of Fig. 12, illustrating the pin construction at the upper end thereof.
Fig. 12 is a front elevational view of the stationary contact board of Fig. 9, partially broken away in section, and fragmentarily shown.

Referring more particularly to Figs. 9–12 of the drawings, which more clearly illustrate the construction of the stationary contact board 18, and also considering Fig. 3 in connection therewith, it will be observed that the movable contacts 71 make contacting engagement with stationary contacts 72 of the butt type, which are resiliently mounted by contact compression springs 73, disposed interiorly within recesses 74 spaced axially along the length of the stationary contact board 18, as indicated in Fig. 9 of the drawings. It will be observed that each stationary contact 72 has a shank portion 75, which is movable in an aperture 76 bored in the insulating bar 77.

Referring to Figs. 3 and 10, it will be observed that cylindrical shields 78, having the outer ends 79 beveled (Fig. 10), are inserted within enlarged recesses 80 provided in the insulating bar 77. Insulating pins 81 are inserted from the sides of the bar 77 to rigidly hold the arc-extinguishing cylinders 78 fixedly in position. Interconnecting stationary contacts 72 of extinguishing units B, C and D, E of Fig. 1 are rectangular connectors 82. Associated with the top arc-extinguishing unit A of Fig. 1 is a substantially L-shaped flexible connector 83, which is clamped between the plate 49 and the boss 16 by the contact compression spring 20, and has its lower end secured to the shank portion 75 of the upper stationary contact 72.

Associated with the lowermost arc-extinguishing unit F is also a substantially L-shaped flexible connector 84, which is maintained under pressure by the spring 20 and the weight of the stationary contact support 18 against a boss portion 85 integrally formed with the intermediate casting plate 26, and which resembles the boss portion 16 of the upper casting 6, although of less height.

Consequently, in the closed-circuit position of the interrupter, as illustrated in Figs. 1–3, the electrical circuit therethrough extends from the terminal portion 10, through the upper casting 6 and boss portion 16 thereof to the flexible connector 83, and hence to the upper contact 72. The circuit then extends through the substantially U-shaped movable bridging contact 40 to the next lowermost arc-extinguishing unit B. The rectangular connector 82 then carries the circuit to the stationary contact 72 of the unit C, from whence the circuit extends in a similar manner down to the flexible connector 84. The current is then carried from the boss portion 85 and through the intermediate casting plate 26 to the terminal portion 70, and thence to the external circuit.

During the opening operation, suitable means, not shown, effects counterclockwise rotative travel of the drive shaft 60, as viewed in Figs. 2 and 3. This rotative motion is transmitted by the several couplings and by the insulating shaft 36 to the movable contact structure 22. This will effect opening separating motion between the movable contacts 71 and the stationary contacts 72 following the taking up of the wiping travel, as provided by the contact compression springs 73. A plurality of arcs will be simultaneously established following the taking up of the lost motion $d$, as indicated in Fig. 3; and the partial confinement of the heated gases by the insulating shields 78 will assist in arc extinction. Preferably the insulating shields 78 are formed from polytetrafluoroethylene, the use of which in connection with $SF_6$ is claimed in the aforesaid application by Lingal, Browne and Strom. Following arc extinction, the movable contact structure 22 completes its counterclockwise travel, as viewed in Fig. 3, to an isolating position, where a plurality of serially related isolating gaps between the contacts 71, 72 are in series.

It will be observed that there are a number of advantages present in the disclosed structure. For example, butt contacts 72 are employed instead of finger contacts. For highly repetitive but light duty, where lubrication is impractical, butt contacts give better life and are more easily broken open by a light mechanism, if welded closed by high-current inrushes, than finger contacts. The close fitting, cylindrical polytetrafluoroethylene shield 78 is used about the contacts 71, 72. This shield 78 prevents the arc from radiating to neighboring arcs and adjacent fibrous insulating surfaces. It also confines the arc and expanded gases so that considerable turbulence and gas flow is thermally produced in the arcing space as the arcing contact 71 moves to its open position.

When using $SF_6$ at three atmospheres, condensation begins at —40° F. Although the viscosity and surface tension is low (lower than water) in liquid $SF_6$, and its dielectric strength is high, it is undesirable to permit this condensate to trickle over insulating surfaces. In the interrupter of Fig. 1, a drip pan 52 (Fig. 1) is provided to collect the condensate forming on the exposed metal surfaces and to allow it to fall free of insulation to ground potential, where suitable heaters 54 can be provided. The falling of such condensate by gravity occurs laterally of the insulating drive shaft 36, as afforded by the positioning of the aperture 50 laterally away from the center line of the drive shaft 36. As mentioned, the cover 49 protects the insulating surfaces beneath it and causes any condensate to fall free of such insulating surfaces.

Figure 14:
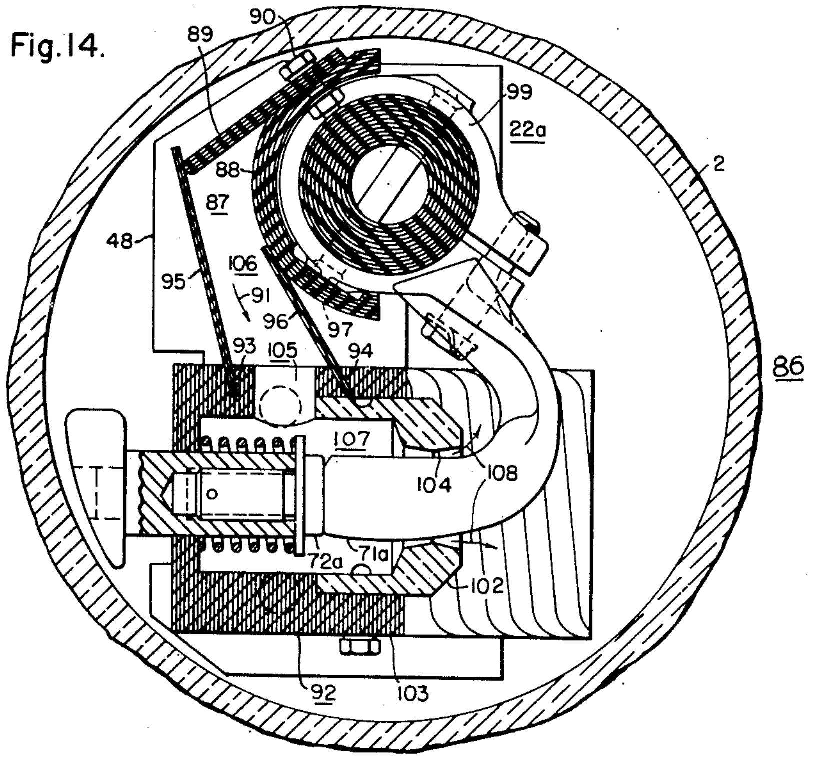
Fig. 14 is an enlarged cross-sectional view taken along the line XIV—XIV of Fig. 13, the contact structure being illustrated in the close-circuit position.
Figure 15:
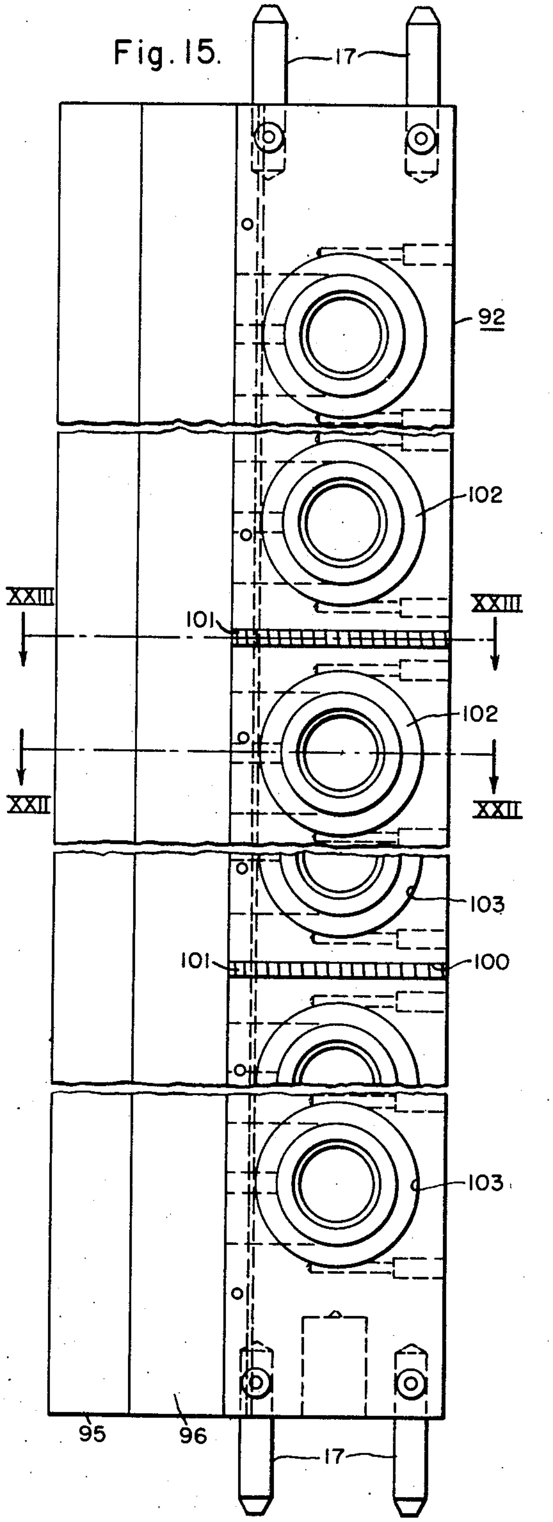
Fig. 15 is a fragmentary side elevational view of the stationary contact board and piston chamber of the circuit interrupter illustrated in Fig. 13.
Figure 16:
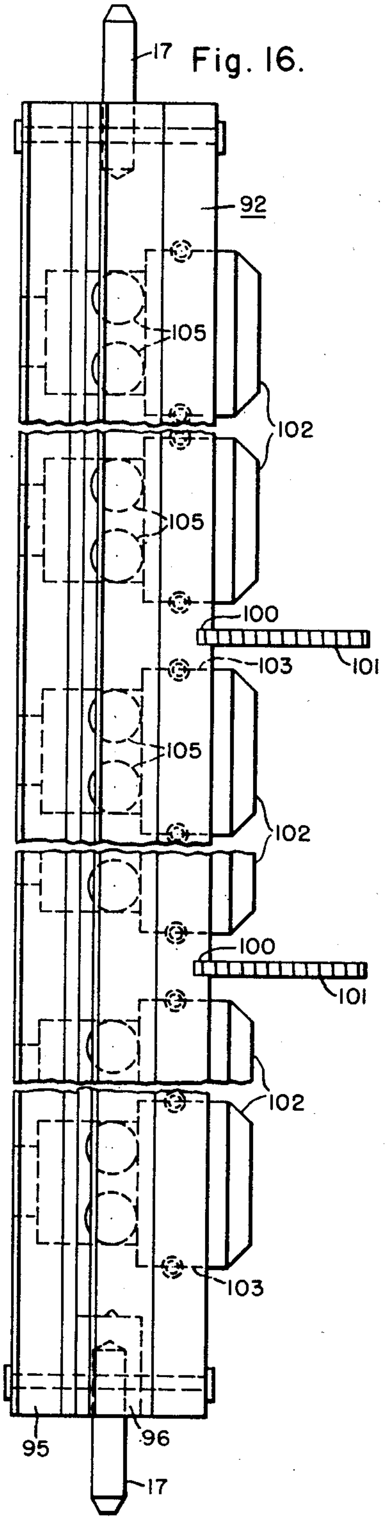
Fig. 16 is a fragmentary top view of the stationary contact board and piston chamber illustrated in Fig. 15.
Figures 17, 18, 19, 20, 21, 22, 23:
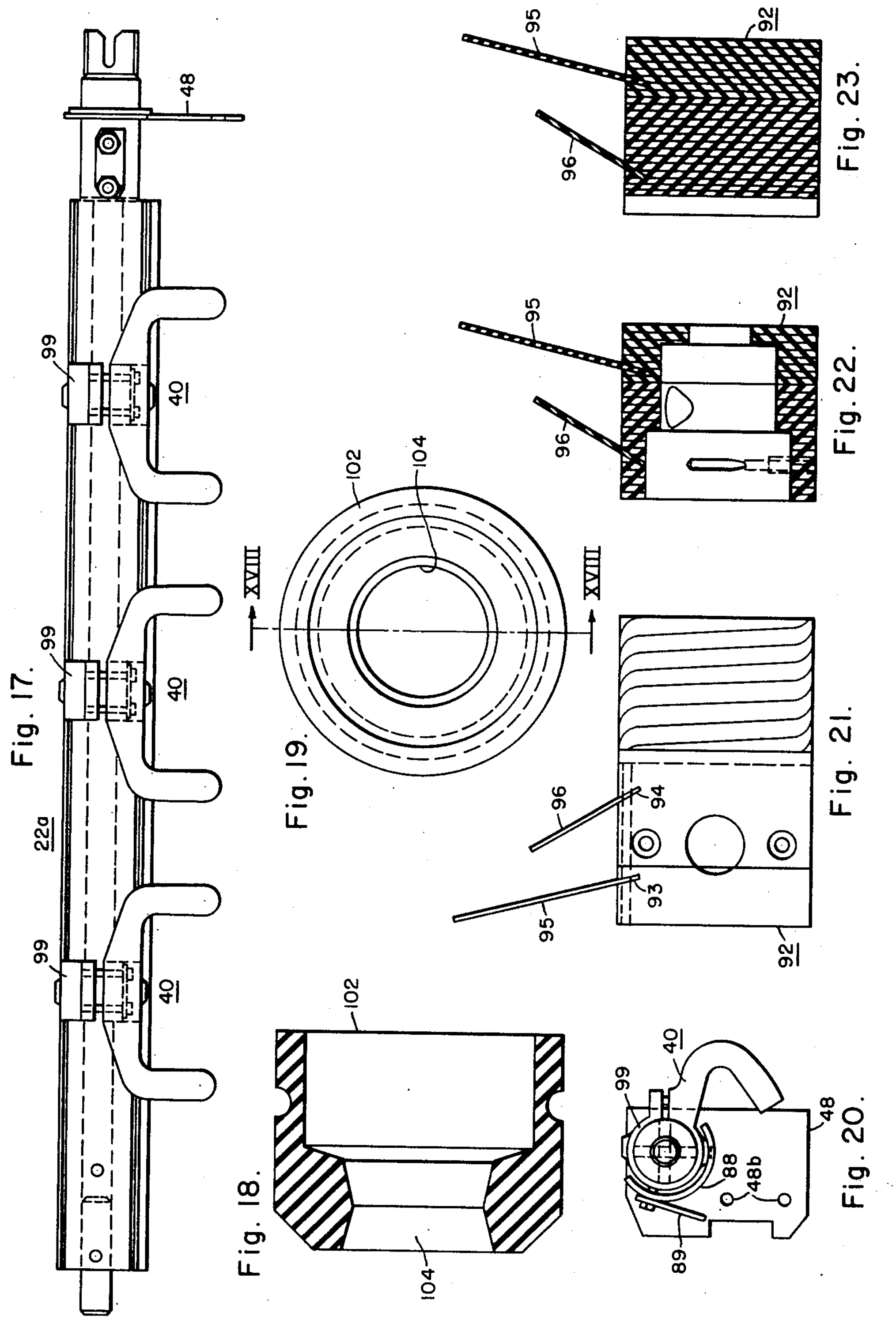
Fig. 17 is a side elevational view of the movable contact assembly employed in the modified circuit interrupter of Fig. 13.
Fig. 18 is an enlarged vertical sectional view taken through the interrupting nozzle employed with the interrupting structures used in the circuit interrupter of Fig. 13 substantially along the line XVIII—XVIII of Fig. 19.
Fig. 19 is an end elevational view of the interrupting nozzle of Fig. 18.
Fig. 20 is an end elevational view of the movable contact structure and piston wing of the circuit interrupter illustrated in Fig. 13.
Fig. 21 is an end elevational view of the stationary contact board of Fig. 15.
Fig. 22 is a sectional view taken along the line XXII—XXII of Fig. 15.
Fig. 23 is a sectional view taken along line XXIII—XXIII of the stationary contact board of Fig. 15.

In the modified interrupter 86, as illustrated in Figs. 13–23, a puffer or piston arrangement, generally designated by the reference numeral 87, is used. As indicated in Fig. 20, a semicircular insulating cylindrical portion 88, extending the entire length between the plates 48, 49, is employed, having attached thereto an insulating plate 89 by screws 90 (Fig. 14). As will be apparent hereinafter, the insulating plate 89 serves the purpose of a piston member movable between the plates 48, 49 and forcing gas to flow during the opening operation, as indicated by the arrows 91 of Fig. 14. The insulating stationary contact support or bar 92 has a pair of longitudinal slots 93, 94 milled therein, as indicated in Figs. 14 and 21, into which are placed and pinned into position a pair of longitudinally extending insulating plates 95, 96. These plates 95, 96, together with the end plates 48, 49 provide a piston chamber 106, out of which gas is forced through apertures 105 by the rotative travel of the piston plate 89, which moves with the movable contact structure 22*a*. It will be noted that the semicircular insulating cylindrical member 88 is secured by screws 97 (Fig. 14) to the bridging contact 40 by the provision of tapped apertures provided in the collar portion 99 of the movable contact structure 22*a*. It will be noted that the insulating contact support 92 has a plurality of grooves 100 milled therein, as indicated in Figs. 15 and 16, into which are positioned insulating plates 101 (Fig. 16), which subsequently are wrapped with insulating tape of polytetrafluoroethylene. The insulating tape-wound plates 101 serve to prevent intermingling of the heated exhaust gases from adjacent arc-extinguishing unit A′, B′ . . . F′.

The modified type of arc-extinguishing units, as shown more clearly in Figs. 14, 16, 18 and 19 comprises insulating, cylindrical, nozzle portions 102, which are positioned into enlarged openings 103 provided axially along the insulating stationary contact support 92. The nozzle portions 102 have nozzles or orifices 104 provided therein, through which the movable contact 71*a* moves during the opening operation.

The stationary contact structures 72*a* are generally similar to those heretofore described; consequently, a minute description thereof is deemed unnecessary. It will be noted that drilled axially along the side edge of the insulating contact support 92 are the openings 105, which communicate with the piston chamber 106. Thus, gas, compressed by the piston member 89 within the piston chamber 106, may move through the openings 105, two of which are provided for each arc-extinguishing unit. This gas will be compressed during the taking up of the contact wipe, and will be therefore available for use immediately upon separation between the contacts 71*a* and 72*a*. Also the provision of the nozzle portion 102, which substantially confines the arcing region 107 intensifies the pressure created by arcing. During unplugging of the nozzle opening 104, following withdrawal of the movable contacts 71*a*, gases will be ejected therefrom, as indicated by the arrows 108 in Fig. 14, and will facilitate arc extinction.

Thus, in this modified form of the invention, a substantially enclosed shield 102 is used to form a tighter fitting orifice around the moving contact, to give greater confinement to the arc and expanded gases, with a better directed blast of gas as the moving contact 71*a* is withdrawn from the shield 102. There is also provided a large-volume, low-pressure puffer or pump 87 to supplement the pressure inside the shield 102 and the gas blast through the orifice 104 as the contact opens. This moving vane or piston member 89 is an insulating plate attached to the rotating contact support 22*a*. The stationary insulating plates 95, 96 form the confining members or cylinder walls. Plates 95, 96 extend the full length of the interrupter, thus providing a large displacement volume. This displacement starts with contact motion and builds up considerable pressure before the contact part position is reached. With a heavy, slow moving gas, such as $SF_6$, it is important to have the gas compressing means for each contact very close to where it is used. In this case, the large, full length compressor 89 discharges directly into each of the six interrupting elements through short openings at 105.

From the foregoing description of two embodiments of the invention, it will be apparent that an interrupter is disclosed having very fine interrupting performance when associated with capacitor switching apparatus; and for interrupting fault current of considerable magnitude a piston or puffer may readily be attached with only slight modification of the movable contact structure to increase the interrupting performance of the individual arc-extinguishing units. The gas is very effectively compressed and directed through the polytetrafluoroethylene orifices 102 in the construction of Fig. 14. Again with only slight rotative travel of the movable contact structure, considerable isolating break distances are obtained because of the multibreaks.

Although we have shown and described specific structures, it is to be clearly understood that the same may be readily modified by those skilled in the art without departing from the spirit and scope of the invention.

We claim as our invention:

1. A circuit interrupter including an elongated casing, a plurality of relatively stationary contacts, means including an elongated insulating support member removably positioned interiorly within said casing for mounting the plurality of relatively stationary contacts in spaced axial arrangement, conducting means for conductively bridging at least a pair of adjoining relatively stationary contacts, a rotatable drive shaft, a substantially U-shaped movable bridging contact carried by the rotatable drive shaft and cooperating with a pair of adjoining relatively stationary contacts to establish two arcs in series, and means defining a substantially enclosed arcing chamber about each of one or more relatively stationary contacts to increase the pressure and to facilitate arc extinction thereat.

2. The combination in a multibreak circuit interrupter of a casing and a rotatable movable contact assemblage movable therewithin including one or more substantially U-shaped movable bridging contacts, a plurality of relatively stationary contacts cooperable with the end portions of said one or more movable bridging contacts, an insulating support member removably mounted within said casing for mounting the relatively stationary contacts in a substantially straight line parallel with the axis of rotation of the rotatable contact assemblage, and one or more partially confining arc-extinguishing units associated with each of one or more of the relatively stationary contacts.

3. A circuit interrupter including a casing, a plurality of relatively stationary butt contacts, means including an elongated insulating support member removably mounted interiorly within said casing for mounting the plurality of relatively stationary butt contacts in spaced axial arrangement, conducting means for conductively bridging at least a pair of adjoining relatively stationary butt contacts, a rotatable drive shaft, a substantially U-shaped movable bridging contact carried by the rotatable drive shaft and cooperating with a pair of adjoining relatively stationary butt contacts to establish two arcs in series, and means defining a substantially enclosed arcing chamber about each of one or more relatively stationary contacts to increase the pressure and to facilitate arc extinction thereat.

4. The combination in a multibreak circuit interrupter of a casing and a rotatable movable contact assemblage movable therewithin including one or more substantially U-shaped movable bridging contacts, a plurality of relatively stationary butt contacts cooperable with the end portions of said one or more movable bridging contacts, an insulating support member removably positioned interiorly within said casing for mounting the relatively stationary butt contacts in a substantially straight line parallel with the axis of rotation of the rotatable contact assemblage, and one or more partially confining arc-extinguishing units associated with each of one or more of the relatively stationary butt contacts.

5. A circuit interrupter including a casing, a plurality of relatively stationary contacts, means including an elongated insulating support member removably positioned interiorly within said casing for mounting the plurality of relatively stationary contacts in spaced axial arrangement, conducting means for conductively bridging at least a pair of adjoining relatively stationary contacts, a rotatable drive shaft, a substantially U-shaped movable bridging contact carried by the rotatable drive shaft and cooperating with a pair of adjoining relatively stationary contacts to establish two arcs in series, and an insulating cylindrical member extending substantially transversely of said support member about each of one or more relatively stationary contacts to increase the pressure and to facilitate arc extinction thereat.

6. The combination in a multibreak circuit interrupter of an elongated casing and a rotatable movable contact assemblage movable therewithin including one or more substantially U-shaped movable bridging contacts, a plurality of relatively stationary contacts cooperable with the end portions of said one or more movable bridging contacts, an insulating support member removably positioned within said elongated casing for mounting the relatively stationary contacts in a substantially straight line parallel with the axis of rotation of the rotatable contact assemblage, and at least an insulating cylindrical member extending substantially transversely of said support member about one of said relatively stationary contacts to increase the arcing pressure thereat.

7. A circuit interrupter of the fluid-blast type including an elongated casing, a rotatable drive shaft having one or more U-shaped movable rotatable contacts fixed thereto and carried thereby, means mounting a plurality of relatively stationary contacts in spaced relationship so as to be cooperable with the movable contacts to establish a plurality of serially related arcs, said drive shaft and said mounting means being disposed in substantially parallel relationship longitudinally within said casing, and piston means including a piston wing rotatable with the drive shaft during the opening stroke to force fluid toward at least one of the arcs.

8. A circuit interrupter including a plurality of relatively stationary contacts, means including an elongated insulating support member for mounting the plurality of relatively stationary contacts in spaced axial arrangement, conducting means for conductively bridging at least a pair of adjoining relatively stationary contacts, a rotatable drive shaft, a substantially U-shaped movable bridging contact carried by the rotatable drive shaft and cooperating with a pair of adjoining relatively stationary contacts to establish two arcs in series, and piston means including a piston wing rotatable with the drive shaft during the opening stroke to force fluid toward at least one of the arcs.

9. The combination in a multibreak circuit interrupter of a rotatable movable contact assemblage including one or more substantially U-shaped movable bridging contacts, a plurality of relatively stationary contacts cooperable with the end portions of said one or more movable bridging contacts, an elongated insulating support member for mounting the relatively stationary contacts in a substantially straight line parallel with the axis of rotation of the rotatable contact assemblage, and piston means including a rotatable piston ring carried by and rotatable with the rotatable contact assemblage to force fluid toward one or more of the arcs.

10. The combination in a circuit interrupter of an elongated insulating support member, a plurality of relatively stationary contacts spaced and mounted longitudinally along the elongated support member, a pair of insulating plates jutting laterally from the support member and mounted thereon, a rotatable drive shaft carrying a plurality of movable contacts, a piston ring carried by the drive shaft and cooperating with the plates to force fluid adjacent one or more of the relatively stationary contacts.

11. The combination in a circuit interrupter of an elongated insulating support member, a plurality of relatively stationary contacts spaced and mounted longitudinally along the elongated support member, a pair of insulating plates jutting laterally from the support member and mounted thereon, a rotatable drive shaft carrying at least one U-shaped movable contact for cooperating with a pair of adjacent stationary contacts to establish arcs in series, and a piston wing carried by the drive shaft and cooperating with the plates to force fluid adjacent one or more of the relatively stationary contacts.

12. A circuit interrupter including an insulating drive shaft having one end adjacent ground potential and the other end at a higher potential, said drive shaft extending substantially vertically upwardly, an apertured drip pan adjacent the end of said drive shaft at higher potential for collecting condensate during operation in a cold ambient, and the aperture in the drip pan being spaced laterally away from the drive shaft so that the condensate may fall downwardly free of the drive shaft.

13. The combination in a circuit interrupter of an insulating support member, a plurality of relatively stationary contacts spaced and mounted longitudinally along the support member, a pair of insulating plates jutting laterally from the support member and mounted thereon, one or more confining nozzle structures associated with one or more of the relatively stationary contacts and having at least one fluid passage between said plates, a rotatable drive shaft carrying a plurality of movable contacts, a piston wing carried by the drive shaft and cooperating with the plates to force fluid adjacent one or more of the relatively stationary contacts through the one or more fluid passages.

14. A circuit interrupter including a sealed casing containing an arc-extinguishing condensible gas, an upstanding interrupting assembly spaced inwardly from the inner wall of said casing and including one or more vertically extending insulating surfaces, and an internally disposed cover at the upper end of the interrupting assembly to prevent condensate dripping over said vertically extending insulating surfaces by causing it to fall downwardly through the space between the inner wall of said casing and the upstanding interrupting assembly.

15. A circuit interrupter of the fluid-blast type including a rotatable drive shaft having a plurality of movable rotatable contacts carried thereby, a plurality of relatively stationary contacts cooperable with the movable contacts to establish a plurality of serially related arcs, piston means including a piston wing rotatable with the drive shaft during the opening stroke to force fluid toward at least one of the arcs, and means delaying separation of the contacts for a predetermined time following rotation of the drive shaft.

16. A multi-break circuit interrupter including an elongated casing, an elongated insulating support member disposed interiorly within said casing and adapted for removal therefrom, said insulating support member supporting a plurality of spaced relatively stationary contacts, a rotatable drive shaft disposed interiorly within said casing and arranged substantially parallel to said elongated insulating support member, one or more U-shaped bridging contacts carried by said rotatable drive shaft, the ends of the one or more U-shaped bridging contacts being adaptable to engage said relatively stationary contacts, means connecting the several separable contacts in series, and a plurality of separate, spaced arc-confining means respectively associated with different pairs of separable contacts to intensify the arcing pressure created at said pairs of separable contacts.

17. A circuit interrupter of the gas-blast type including an elongated casing, a rotatable drive shaft having one or more U-shaped movable rotatable contacts fixed thereto and carried thereby, means mounting a plurality of relatively stationary contacts in spaced relationship so as to be cooperable with the movable contacts to establish a plurality of serially related arcs, said drive shaft and said mounting means being disposed in substantially parallel relationship longitudinally within said casing, an arc-extinguishing gas in said casing, an orifice of insulating material in which at least one of the arcs is established, and piston means including a piston wing rotatable with the drive shaft during the opening stroke to force said arc-extinguishing gas to flow toward at least said one of the arcs in the orifice, said piston means compressing said arc-extinguishing gas at one side of the orifice and causing a flow of the compressed gas through the orifice to aid in extinguishing the arc therein.

18. A circuit interrupter including a plurality of relatively stationary contacts, means including an elongated insulating support member for mounting the plurality of relatively stationary contacts in spaced axial arrangement, conducting means for conductively bridging at least a pair of adjoining relatively stationary contacts, a rotatable drive shaft, a substantially U-shaped movable bridging contact carried by the rotatable drive shaft and cooperating with a pair of adjoining relatively stationary contacts to establish two arcs in series, a substantially gas-tight casing enclosing at least the space between the contacts in which the arcs are established, an arc-extinguishing gas in said casing, an orifice of insulating material in which at least one of the arcs is established, and piston means including a piston wing rotatable with the drive shaft in the casing during the opening stroke to force said arc-extinguishing gas toward and through the orifice in which at least said one of the arcs is established.

References Cited in the file of this patent

UNITED STATES PATENTS

| | | |
|---|---|---|
| 976,549 | Cheney | Nov. 22, 1910 |
| 2,223,901 | Scarpa | Dec. 3, 1940 |
| 2,467,788 | Van Sickle | Apr. 19, 1949 |
| 2,552,427 | Heidmann | May 8, 1951 |
| 2,706,758 | Thibaudat | Apr. 19, 1955 |